United States Patent
Ufema

(10) Patent No.: US 6,176,090 B1
(45) Date of Patent: Jan. 23, 2001

(54) FROZEN CAPPUCCINO AND FRUIT SMOOTHIE MACERATOR

(75) Inventor: Lance W. Ufema, Lewistown, PA (US)

(73) Assignee: Rich Coast Corporation, Lewistown, PA (US)

( * ) Notice: Under 35 U.S.C. 154(b), the term of this patent shall be extended for 0 days.

(21) Appl. No.: 09/375,938

(22) Filed: Aug. 17, 1999

(51) Int. Cl.[7] ...................................................... A23G 9/18
(52) U.S. Cl. .................................. 62/68; 62/342; 62/343; 366/144; 366/290
(58) Field of Search .............................. 62/68, 342, 343; 366/144, 290, 292, 318

(56) References Cited

U.S. PATENT DOCUMENTS

| | | | |
|---|---|---|---|
| 2,558,449 | * 6/1951 | Maranz | 366/290 |
| 4,144,293 | * 3/1979 | Hamoto et al. | 366/290 |
| 4,322,021 | 3/1982 | Olsson | 222/231 |
| 4,580,905 | * 4/1986 | Schwitters et al. | 366/290 |
| 4,796,440 | * 1/1989 | Shiotani et al. | 62/343 |
| 5,205,129 | 4/1993 | Wright et al. | 62/68 |
| 5,275,309 | 1/1994 | Baron et al. | 222/129 |
| 5,447,371 | * 9/1995 | Agapiou | 366/290 |
| 5,494,194 | 2/1996 | Topper et al. | 222/146.6 |
| 5,553,744 | 9/1996 | Sawyer, III | 222/64 |
| 5,620,115 | 4/1997 | McGill | 222/95 |
| 5,775,533 | 7/1998 | Schroeder | 222/95 |
| 5,826,754 | 10/1998 | Ishaya et al. | 222/185.1 |
| 5,842,603 | 1/1998 | Schroeder et al. | 222/23 |
| 6,058,721 | * 5/2000 | Midden et al. | 62/342 |
| 6,082,120 | * 7/2000 | Hoffmann et al. | 62/68 |

* cited by examiner

Primary Examiner—William E. Tapolcai
(74) Attorney, Agent, or Firm—Carmen Santa Maria; McNees, Wallace & Nurick

(57) ABSTRACT

An apparatus for transforming a frozen confection having a coarse texture into a confection having a smooth texture and lighter appearance. The apparatus is comprised of a maceration assembly used in conduction with a frozen confection machine. The apparatus includes a motor, an electrical connection between the motor and a power supply and a mounting bracket for mounting the motor to the confection machine. Extending from the motor is at least one rotatable motor shaft. The shaft extends through a mount having an integral mount cylinder with a seal seat. A sealing device such as an o-ring, is positioned within the seal seat. A whipping device is attached to the rotatable shaft which extends into a maceration chamber. The maceration chamber has an inlet for receiving frozen confection and an outlet for discharging a semi-frozen confection slurry and is hollow and open at one end, the open end sliding over the whipping device and mount, while forming a seal with the sealing device. A detector detects the presence of an object below the maceration chamber outlet, so as to activate the motor and rotate the whipping device so that coarse frozen confection entering the inlet is macerated within the maceration chamber by the whipping device immediately prior to the discharge through the outlet as a smooth semi-frozen slurry.

18 Claims, 4 Drawing Sheets

FROZEN CAPPUCCINO AND FRUIT SMOOTHIE MACERATOR

BACKGROUND OF THE INVENTION

1. Field of the Invention

The present invention relates generally to dispensing equipment for soft serve confections and specifically to dispensing equipment for frozen cappuccino.

2. Description of the Prior Art

Soft serve confections are very popular, having expanded from the corner ice cream store. The soft serve confection business is now available in the corner convenience store. Many different types of frozen confections are now available, since the equipment to make and dispense is now readily available and can be placed on a counter where it is readily accessible to both the customer and the person responsible for maintaining and servicing the equipment.

The equipment currently used is well known, being in use for many years. While some modification and improvements have been made, the confection is maintained in the frozen state by a refrigeration unit contained within a central drum that is maintained at a preselected temperature below the freezing temperature of the fluid that is to be dispensed as frozen or semi-frozen product. As fluid is moved over the surface of the drum, the temperature is reduced below its freezing temperature, and the fluid crystallizes as a solid material on the drum surface. The crystalized soft material is removed from the surface of the drum by an auger that is activated by the user using an activation device, typically a handle that activates the auger my pulling the handle forward . The auger moves over the surface of the drum and scrapes or removes the frozen material from the drum surface while moving the material toward the dispensing assembly located below the handle. While this assembly is commonly used and works well with most liquids, the texture of the frozen product will be a function of the liquid that is frozen.

U.S. Pat. No. 5,494,194 to Topper et al. recognized that the texture of the frozen product is important. This patent recognizes that certain viscous materials such as ice cream can have their texture degraded by repeated compression and decompression of the confection, causing undesirable ice crystals to form. These ice crystals degrade the taste and texture of the confection. To avoid the formation of ice crystals in the confection, Topper et al. moves the confection from a storage container through the refrigeration unit to the dispenser by minimizing the compression of the confection. While this solution is very effective for maintaining the texture of viscous materials that may form ice crystals as a result of repeated compression and decompression cycles, it does not provide a solution for liquids that form ice crystals as they are cooled below their freezing temperature on the drum of a refrigeration unit. One such liquid is cappuccino that is having increased popularity as a frozen confection.

Other examples of means for dispensing frozen product from similar refrigeration units are illustrated in U.S. Pat. No. 5,275,309 to Baron et al. and U.S. Pat. No. 5,553,744 to Sawyer, III. Sawyer, III discloses a bottled water dispenser that includes an ice maker and an ice crusher.

While certain confections have a smooth texture as they form a frozen concoction during refrigeration, other confections under certain conditions can and do from ice crystals that degrade the taste of the confection. What is needed is a simple, inexpensive device that can be easily fitted to existing frozen confection machines and that can minimize the effect of the crystallization process, forming a smooth confection that improves the taste of the confection.

SUMMARY OF THE INVENTION

The present invention is an apparatus that can be attached to an existing soft serve confection machine or that can be provided as an integral part of a new soft serve confection machine. The apparatus includes a maceration assembly that can receive a predetermined quantity of soft serve product and modify the product. The soft serve product is produced in well known frozen confection machines that utilize a central refrigeration unit typically housed within a metal drum. Soft serve product is formed on the cool metal drum as it solidifies. The soft serve product will have a varying consistency, depending upon the type of frozen confection being produced. In some cases, the confection will form a smooth product. For some confections, rather coarse crystals are formed during solidification. The solidified confection is removed from the metal drum and is translated toward a discharge port as the drum rotates in relation to an auger. The soft serve product will have a varying consistency, depending upon the type of frozen confection being produced. In some cases, the frozen product will form a smooth product. However, the present invention is most suitable for use with those confections that form large ice crystal, in that the product modification forms a smooth confection.

The maceration assembly typically is mounted outside of the portion of the frozen confection machine that houses the refrigeration unit, although this is not necessary. However, the maceration chamber must be positioned to receive the frozen confection after it leaves the refrigeration unit and before it is dispensed into a receiving container for consumption. The maceration chamber is an enclosed unit that includes a first opening through which the frozen confection is received and a second opening through which the frozen confection is dispensed. Extending into the maceration chamber is a whipper assembly. The whipper assembly consists of a whipping device mounted on a rotatable shaft. The whipping device can be any mechanical assembly such as an auger, an impeller, blades projecting at an angle from the motor shaft or such that can act on the frozen confection. The rotatable shaft extends outward from a standard motor assembly that rotates at a predetermined speed.

A detector is activated to activate the motor and initiate rotation of the whipper assembly upon detection of a predetermined condition. The detector can be activated by the predetermined conditions in a number of ways. As frozen confection is translated by the whipping device to a discharge port or point where it enters the maceration chamber, presence of the frozen confection may be detected as it exits the refrigeration unit and enters the maceration chamber. The detection of the confection activates the motor which in turn causes the whipper assembly to rotate. The action of the whipper assembly blends the frozen confection, modifying its consistency as it moves past a whipping device and is dispensed or discharged through the second opening. The blended confection is noticeable smoother and more appealing to the consumer. In addition, the blended confection also has an appearance of a lighter color than when it is discharged from the frozen confection machine.

An advantage of the present invention is that it can be readily adapted to existing confection machines that yield product having large, grainy-type of crystals with little effort. The use of the present invention with existing confection machines will modify the product so that the texture of the product will be smoother and creamier. Because the modification can be made with little effort, the cost of the modification is low.

Another advantage of the present invention is that it can be readily removed from existing machines. This feature makes it very easy to clean. If necessary, it also makes the present invention easy to remove if the type of confection produced by the machine is changed to one which has a smooth texture.

Still another advantage of the present invention is that it can be incorporated into the design of a new machine. While the maceration chamber remains easy to remove for cleaning purposes, the motors that drive the whipping device are internal to the confection machine, so as to be less obtrusive.

Other features and advantages of the present invention will be apparent from the following more detailed description of the preferred embodiment, taken in conjunction with the accompanying drawings which illustrate, by way of example, the principles of the invention.

Whenever possible, the same reference numbers will be used throughout the figures to refer to the same parts.

DETAILED DESCRIPTION OF THE INVENTION

Figure 1:
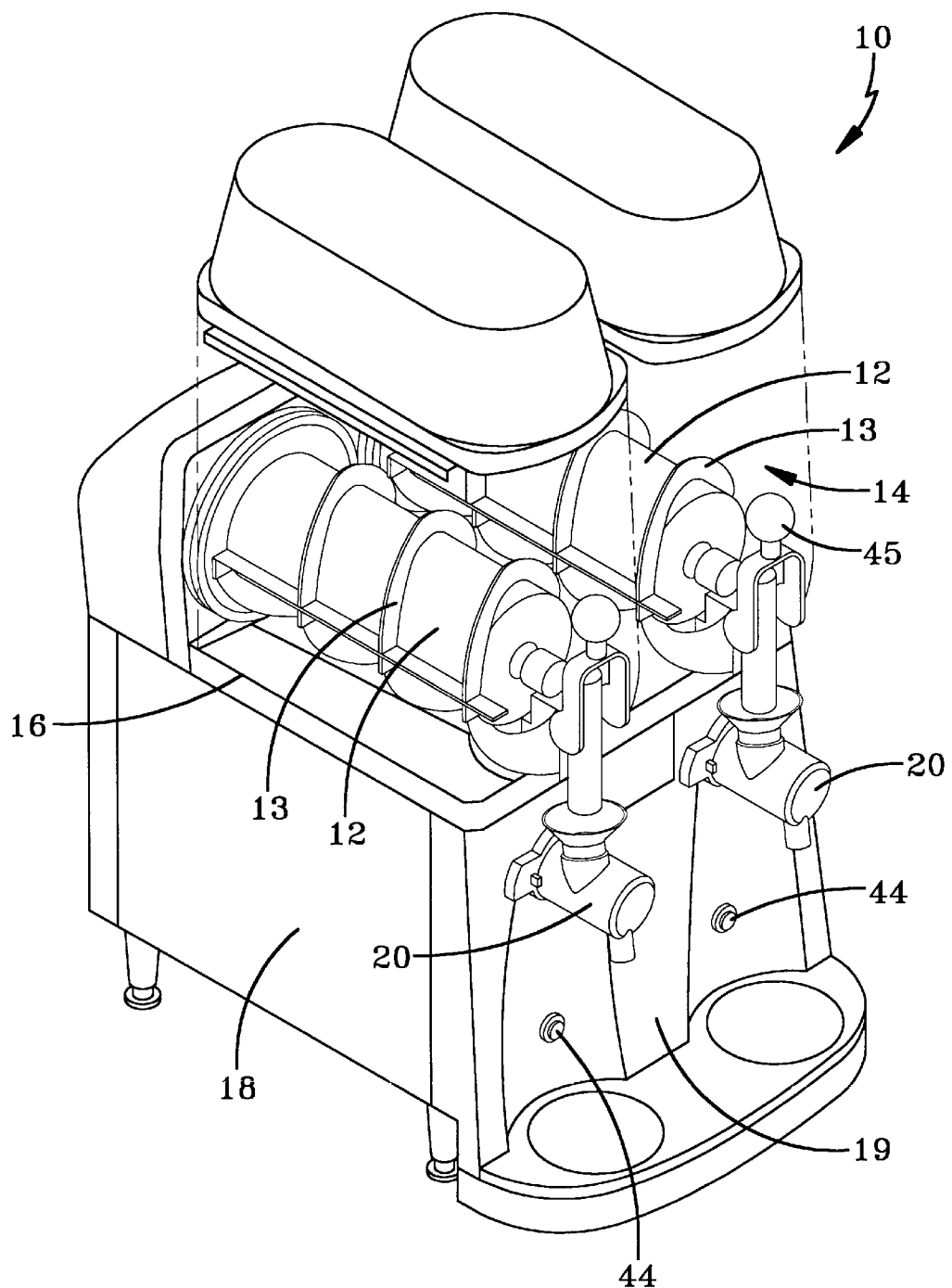
FIG. 1 is a perspective view of a frozen cappuccino machine that incorporates the maceration chamber of the present invention.

FIG. 1 is a perspective view of a new frozen cappuccino machine 10 that incorporates the maceration assembly 20 of the present invention. The cappuccino machine of FIG. 1 is a unit that has two separate refrigeration units 12 over which are auger units 13 and two separate fluid compartments 14 for holding the fluid so that two different flavors of cappuccino are available at any one time. Compartments 14 are separated by a flat platelike surface 16 from a housing 18 which hold the electrical and mechanical assemblies for the cappuccino machine. Housing 18 includes a front panel 19. It will be understood that a unit having a single compartment 14 for dispensing a single flavor can be provided.

Figure 2:
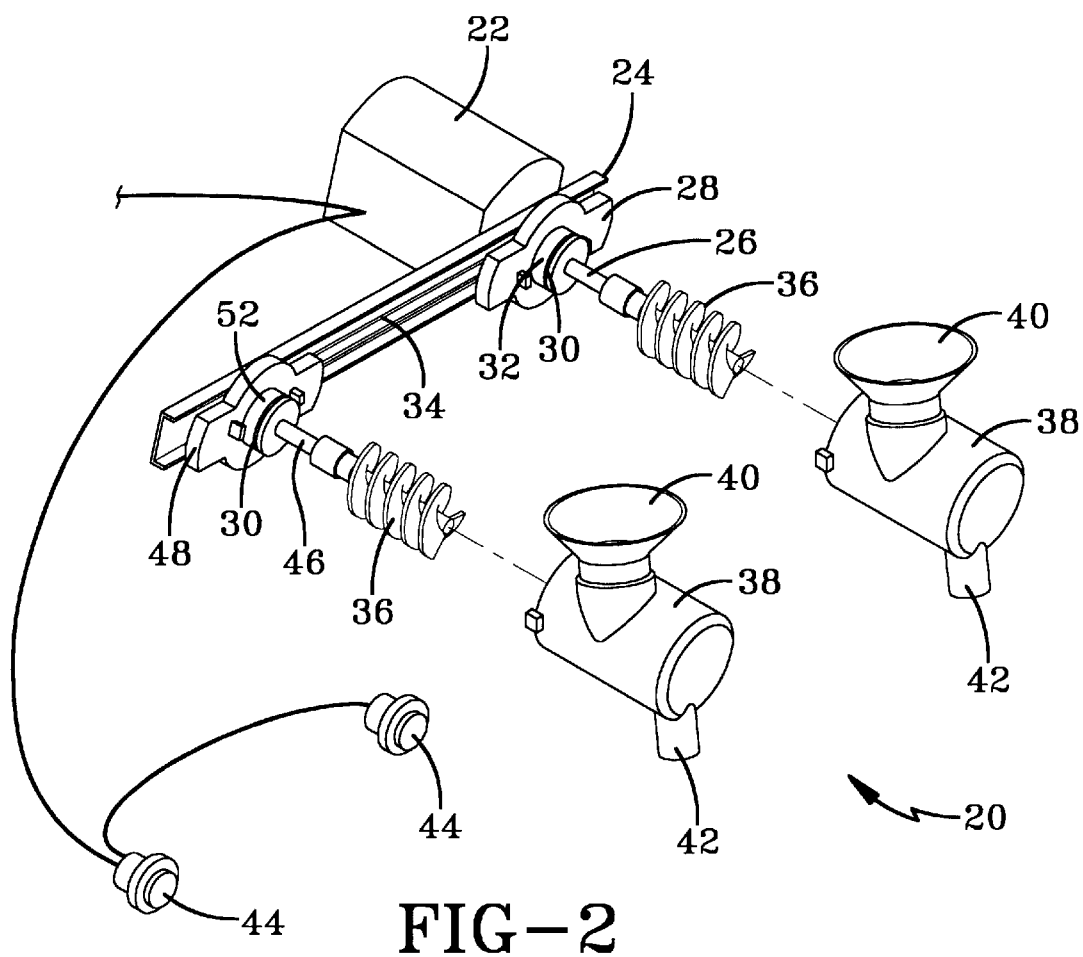
FIG. 2 is an exploded view of the frozen cappuccino machine of FIG. 1.

Referring now to FIG. 2, a dual whipper assembly 20 includes a motor 22 located within housing 18 that is supported by a mounting bracket 24. Mounting bracket 24 is attached by any convenient method to housing 18. Motor shaft 26 of motor 22 extends through an aperture (not shown) in mounting bracket 24 and housing 18. A pair of mounts 28, 48 are mounted to housing 18, preferably by attachment to mounting bracket 24. A second rotatable shaft 46 is mounted to mount 48. A drive belt 34 extends between motor shaft 26 and second rotatable shaft 46 so that activation of motor 22 causes rotation of both shafts 26, 46. O-rings or seals 30 are positioned within depressions or seal seats that extends 360 around each integral mount cylinder 32, 52 that extend axially from mounts 28, 48. The o-rings are preferably neoprene or other rubber substitutes, but may be any plastic that is moldable, flexible and can form an effective seal. When o-rings 30 are assembled into the depressions, the outer diameters of the assembled o-rings 30 are slightly larger than the diameter of mount cylinder 32, 52. Attached to each shaft 26, 46 is an impeller 36. The impeller in the preferred embodiment is made of a plastic and is press-fit onto the shaft. A preferred plastic is nylon, which is light in weight and will not contribute to shaft imbalance. While a metal impeller such as stainless steel may be used and affixed to the shaft by any convenient means such as a set screw, plastic, such as nylon is preferred since it is effective and inexpensive being made by injection molding. Replacement parts can be made cheaply and worn parts can be disposed of, with no concern for refurbishment. A maceration chamber 38 is open at one end so it can slide over impeller 36 and mount cylinders 32, 52, the inner diameter of each maceration chamber 38 being larger than impeller 36 and mount cylinders 32, 52. However, maceration chamber 38 being hollow, its inner diameter is slightly smaller than the outer diameter of assembled o-rings 30. To position maceration chamber 38 over o-ring 30, a small amount of force is required. However, the force fit of the inner diameter of chamber 38 over o-ring 30 creates a seal between maceration chamber 38 and impeller mount cylinders 32, 52 by o-rings 30. Maceration chamber 38 is also made from plastic in the preferred embodiment, for the same reasons that plastic is preferred for the impeller. Plastic is also easy to remove and clean. A preferred plastic is a clear or translucent nylon. In addition to being cost effective, it provides visual access to the interior of the chamber, making it easier to ascertain that cleanliness is being maintained.

Figure 3:
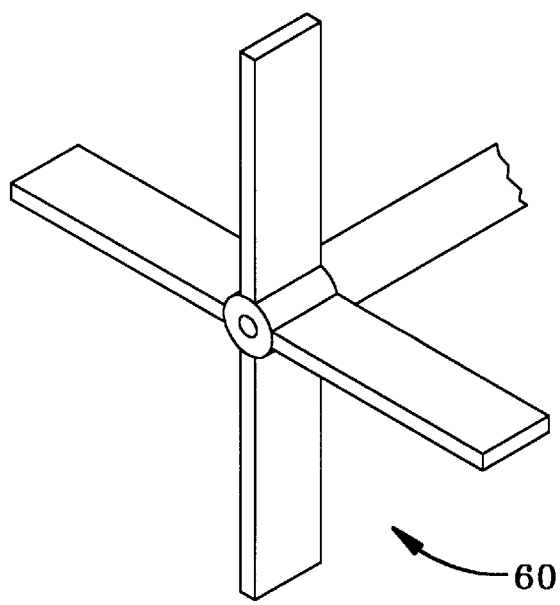
FIG. 3 is a perspective view of a blades assembly used as a whipper.

Maceration chamber 38 includes an inlet 40 and an outlet 42. As shown in FIG. 2, inlet 40 is in the form of a funnel-shaped device, and outlet 43 lies on the underside of maceration chamber 38. In the preferred embodiment inlet 40 is a separate funnel-shaped device preferably made from plastic that slides into an aperture on the upper portion of chamber 38. However, inlet 40 can assume any desirable shape and may even be molded included as an element in a single piece maceration chamber 38. Referring again to FIG. 1, maceration chamber 38 extends outward from front panel 19 of housing 18 being located so that confection in the form of frozen confection is transferred from the refrigeration unit into maceration chamber 38. Inlet 40 must have an opening large enough to permit the frozen confection to move freely from the refrigeration unit into the maceration chamber. On front panel 19 are detectors 44 that detects when a cup or a container is placed below outlet 42 of either maceration chamber 38. The detection of the cup by detector 44 closes a switch thereby automatically activating motor 22. Activation of motor 22 causes rotation of shafts 26, 46. As either handle 45 is engaged to cause frozen confection to be removed from the refrigeration unit and transferred from compartments 14, the frozen confection is transferred through inlets 42 where it is engaged in maceration chamber 38 by whipping device which acts to whip the frozen confection while moving it in the direction of outlet 42. The effect of the whipping device on the frozen confection is to macerate or fracture the large ice crystals of the confection into much smaller ice crystals, thereby changing the texture from a coarse grainy texture to a smooth, consistent texture that is lighter in appearance. While the maceration chamber 38 and whipping device shown as an auger 32 act as a whipper assembly, it will be understood that the auger-like impeller may be replaced by any suitable mechanical device that can act in the same manner to macerate the large ice crystals into smaller ice crystals. For example, a whipping device that consists of a bladed assembly 60 extending at substantially right angles to the motor shaft as shown in FIG. 3 has been found to perform satisfactorily. While the embodiment discussed above utilizes a single motor to drive the dual whipper assemblies, each whipper assembly 20 can be operated independently by a dedicated motor.

Figure 4:
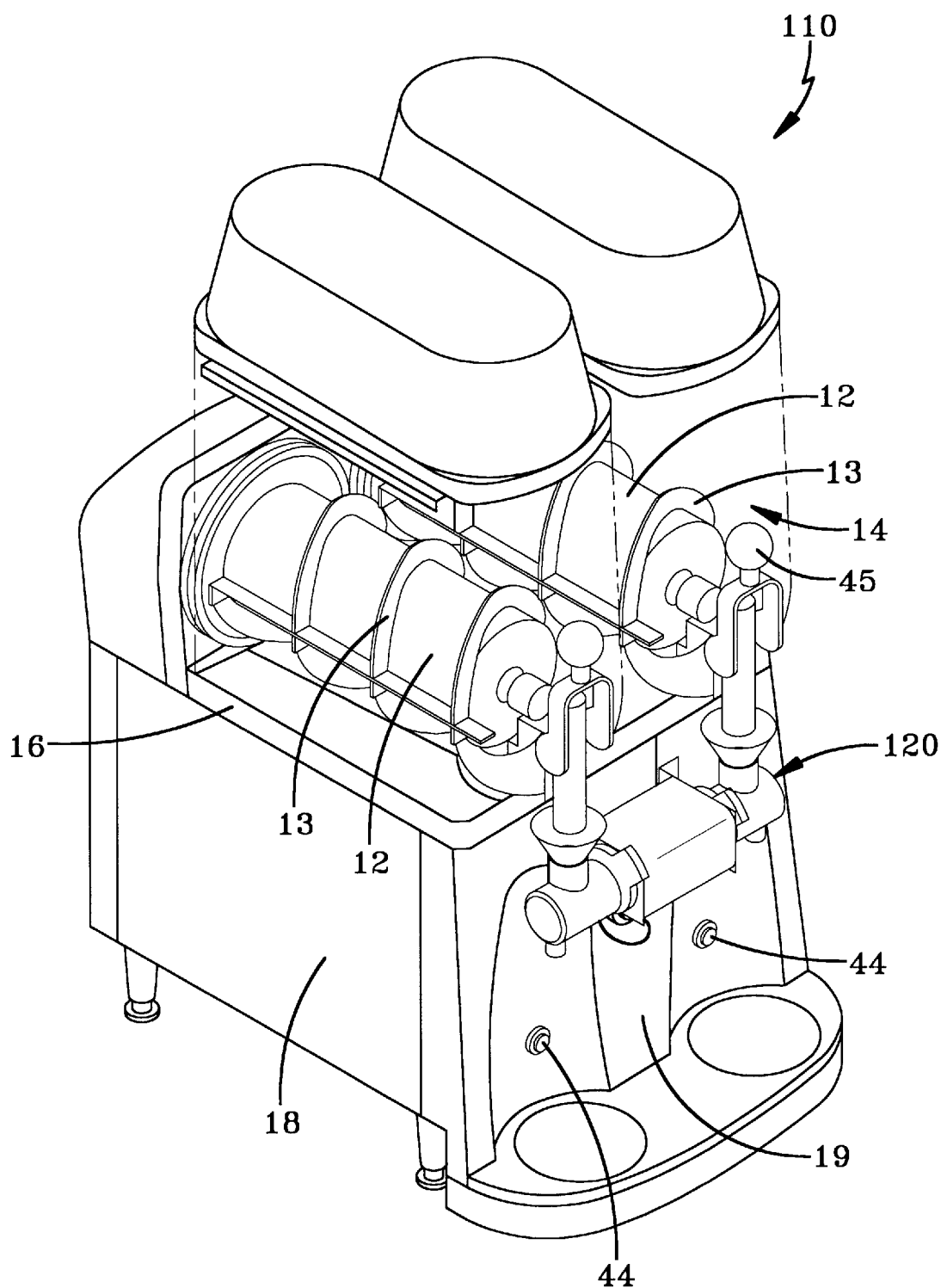
FIG. 4 is a perspective view of a frozen cappuccino machine that has been retrofitted with the maceration chamber of the present invention.

In another embodiment of the present invention, a maceration assembly is retrofitted to an existing cappuccino machine. Referring to FIG. 4, a dual whipper assembly 120 is assembled to the front panel of an existing cappuccino machine 110. The cappuccino machine 110 of FIG. 4 also has two separate refrigeration units 12 over which are auger units 13 and two separate fluid compartments 14 for holding the fluid so that two different flavors of cappuccino are available at any one time. Compartments 14 are separated by a flat plate-like surface 16 from a housing 18 which hold the electrical and mechanical assemblies for the cappuccino machine. Housing 18 includes a front panel 19. Frozen confection is dispensed from either compartment by engaging one of handles 45, which activates auger and discharges frozen confection from one of compartments 14. It will be understood that a unit having a single compartment 14 for dispensing a single flavor can be provided.

Figure 5:
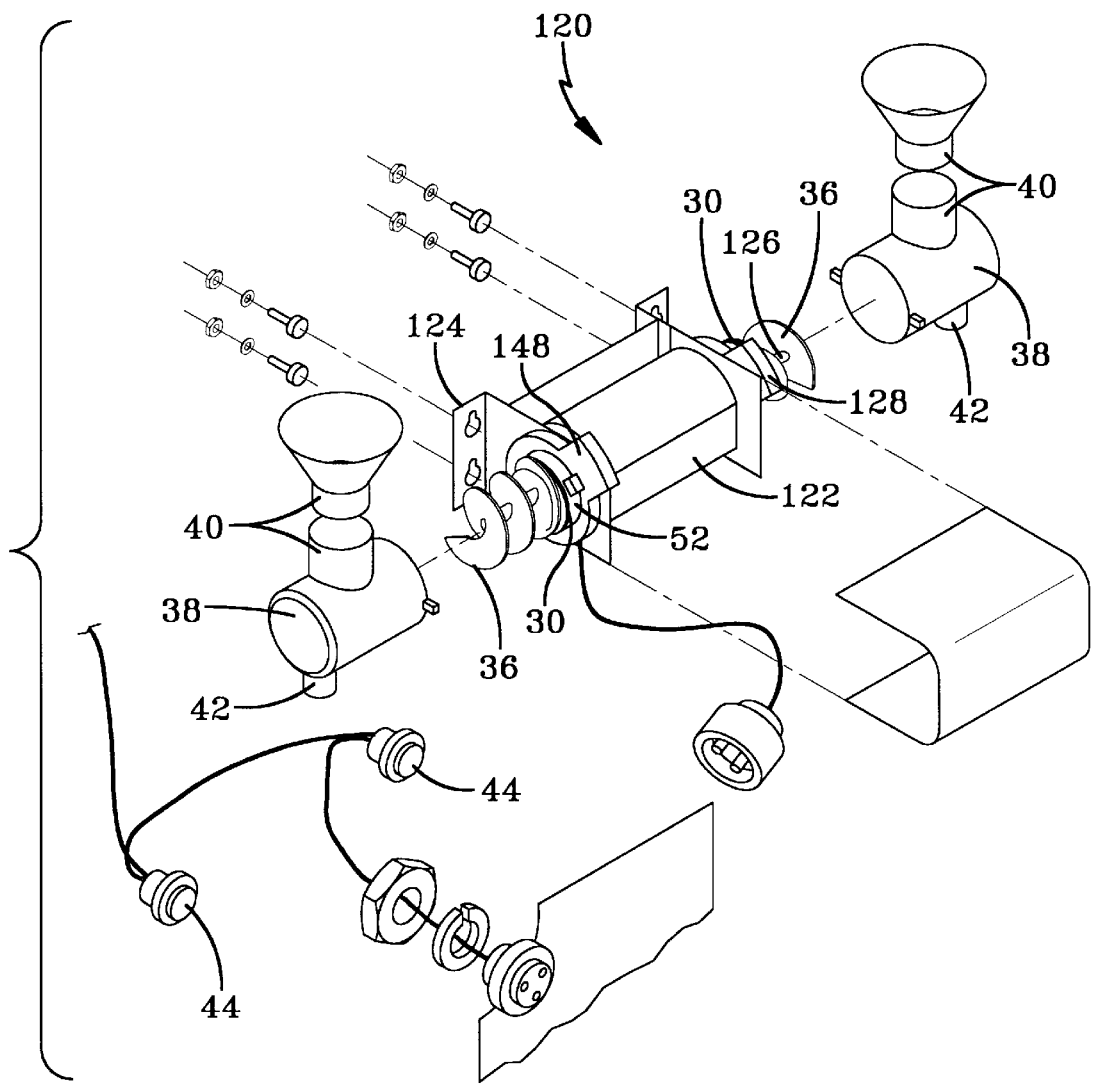
FIG. 5 is an exploded view of the frozen cappuccino machine of FIG. 4.

While dual whipper assembly 120 operates on frozen confection in the same manner to produce the same improved result, whipper assembly 120 is assembled to cappuccino machine 110 in a slightly different manner than whipper assembly 20 is assembled to new cappuccino machine 10. Referring now to FIG. 5, a dual whipper assembly 120 includes a motor 122 that is supported by a mounting bracket 124 located outside of housing 18. Mounting bracket 124 is attached by any convenient method to housing 18, but is bolted on to housing in the preferred embodiment. Motor 122 includes motor shaft 126 that extends in opposite directions outward from motor 122 through apertures in mounting bracket 124. A pair of mounts 128, 148 are mounted on opposed sides to mounting bracket 124. O-rings or seals 30 are positioned within depressions that extends 360° around each mount cylinder 32, 52 that extend axially from mounts 128, 148. Maceration chambers 38 are assembled to mounts 128, 148 over o-rings 30 and impellers 36 in the manner previously described.

Maceration chamber 38 is as previously described including an inlet 40 in the form of a funnel-shaped device and an outlet 42 on the underside of maceration chamber 38. Front panel 19 of cappuccino machine 110 is retrofitted with detectors 44 that detects when a cup or a container is placed below outlet 42 of either maceration chamber 38 and operates as previously described by detecting the presence of a cup and automatically activating motor 122.

While detectors 44 can be any suitable device such as electronic sensors, position sensors and the like, capable of detecting the proximity of a cup or container, optical detectors are preferred since they are readily available and inexpensive.

In operation, liquid cappuccino is placed into compartments 14. While the invention is described in terms of frozen cappuccino, it will be understood by those familiar with the production of this confection that cappuccino as used herein and within the industry is actually a combination of flavored additives such as vanilla, chocolate, Irish cream or other coffee-like flavoring along with creaming agents, sugar and other additives. This liquid, placed into the compartment or compartments 14, is not cappuccino such as is purchased in a coffee shop. Frozen cappuccino is formed on a central drum, which is maintained at a temperature of the frozen cappuccino. However, due to the solidification process for cappuccino, it freezes as large ice-like crystals. A customer places a cup below outlet 42 of a maceration chamber 38. The presence of the cup is detected by an optical sensor 40, which immediately activates motor 22 causing rotation of an impeller within the whipper assembly.

The customer activates handle 45 on the cappuccino machine which activates auger 13, causing course-grained frozen cappuccino to be transported into inlet 40, where it falls into the interior of maceration chamber 38. The frozen cappuccino is then whipped by whipper assembly 20 and moved toward outlet 42. The whipping reduces the size of the ice crystals causing a more uniform, smoothly textured frozen confection. The mechanical action of the whipper assembly on the frozen confection reduces the size of the crystals and also melts a small amount of the confection, but not enough to affect the frozen nature of the confection. This small amount of melted confection combines with the remaining amount of the crystals, which still form the bulk of the confection, to create a semi-frozen, flowable slurry of uniform texture. While a small amount of air may be blended with the confection, its contribution to the uniform texture is small.

While the above description has been directed to freezing of a liquid concoction referred to as "cappuccino" that is combination of flavored additives such as vanilla, chocolate, Irish cream or other coffee-like flavoring along with creaming agents, sugar and other additives, the machine also works effectively with a concoction referred to as "fruit smoothies." Fruit smoothies, as used within the industry, are comprised of a combination of fruit-flavored base flavoring along with creaming agents, sugar and other additives. Like the "cappuccino" the fruit smoothies also form rather large crystals when frozen in standard confection machines. Thus, the present invention is also effective in improving the texture and the consistency of this frozen confection.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A confection apparatus for producing frozen confection having a smooth texture, comprised of:
    a machine for producing frozen confection having a central refrigeration unit housed within a-metal drum, an assembly for removing frozen confection formed on the metal drum and translating the frozen confection toward a discharge port, and means for activating the assembly for removing frozen confection;
    a maceration assembly mounted to the frozen confection machine, the assembly including a chamber having an inlet for receiving frozen confection from the discharge port of the machine, a whipping device positioned within the chamber for reducing the size of the frozen confection crystals and whipping the frozen confection into a semi-frozen slurry of smooth, uniform texture that moves the frozen confection to an outlet of the chamber, the whipping device rotatably attached to a motor shaft;
    a motor that rotates the motor shaft when activated; and
    a detector for activating the motor upon detecting the presence of a predetermined condition.

2. The confection apparatus of claim 1 wherein the detector detects the presence of a cup below the chamber outlet.

3. The confection apparatus of claim 1 wherein the detector detects activation of the assembly for removing frozen confection from the frozen confection machine.

4. The confection apparatus of claim 1 wherein the detector detects a discharge of frozen confection from the frozen confection machine into the inlet of the maceration assembly.

5. The confection apparatus of claim 1 wherein the motor is integral with the maceration assembly which is mounted to the frozen confection machine below the discharge port.

6. The confection apparatus of claim 1 wherein the motor is mounted on a mounting bracket within the frozen confection machine, and the motor shaft extends through the frozen confection machine and into the maceration assembly mounted below the discharge port of the frozen confection machine.

7. A confection apparatus for producing frozen confection having a smooth texture. comprising:
  a machine for producing frozen confection having a central refrigeration unit housed within a metal drum, an assembly for removing frozen confection formed on the metal drum and translating the frozen confection toward a discharge port, and means for activating the assembly for removing frozen confection; and
  a maceration assembly mounted to the machine for receiving frozen confection from the machine discharge port, the maceration assembly including a motor, an electrical connection between the motor and a power supply, a mounting bracket for mounting the motor to the machine, at least one rotatable motor shaft connected to the motor, a mount having an integral mount cylinder with a seal seat through which extends the at least one motor shaft, a sealing device positioned within the seal seat, a whipping device attached to the at least one rotatable shaft, a maceration chamber having an inlet for receiving frozen confection and an outlet for discharging a semi-frozen slurry of confection, the chamber being hollow and open at one end, the open end of the chamber sliding over the whipping device and mount while forming a seal with the sealing device, and
  a detector for detecting the presence of an object below the maceration chamber outlet so as to activate the motor and rotate the whipping device while the object is present below the outlet so that confection entering the inlet is macerated within the maceration chamber by the whipping device immediately prior to the discharge through the outlet.

8. The assembly of claim 7 wherein the detector is an optical detector.

9. The assembly of claim 7 wherein the detector is an electronic proximity sensor.

10. The assembly of claim 7 wherein the whipping device is an impeller.

11. The assembly of claim 7 wherein the whipping device is an auger.

12. The assembly of claim 7 wherein the whipping device is a plurality of blade-shaped projections extending an a predetermined angle from the motor shaft.

13. The assembly of claim 7 wherein the inlet of the maceration chamber further includes a removable funnel.

14. The assembly of claim 7 wherein the inlet of the maceration chamber is an integral funnel-shaped opening.

15. The assembly of claim 7 wherein the maceration chamber is made from a plastic material.

16. The assembly of claim 15 wherein the plastic material is nylon.

17. The assembly of claim 7 wherein the whipping device is made from plastic.

18. A method for transforming a frozen confection having a coarse texture into a confection having a smooth texture, comprising the steps of:
  producing a frozen confection having a coarse texture in a frozen confection machine having a central refrigeration unit housed within a metal drum, an assembly for removing frozen confection formed on the metal drum and translating the frozen confection toward a discharge port, and means for activating the assembly for removing frozen confection;
  discharging the coarse frozen confection into an assembly mounted to the frozen confection and below its discharge port, the assembly including a chamber having an inlet for receiving frozen confection from the discharge port of the machine, a whipping device positioned within the chamber, the whipping device rotatably attached to a motor shaft and an outlet;
  activating a motor attached to the motor shaft, causing rotation of the whipping device;
  whipping the coarse frozen confection into a semi-frozen slurry and transporting the semi-frozen slurry to the outlet; and
  discharging the semi-frozen slurry from the outlet.

* * * * *